Jan. 14, 1964      C. HANSEN      3,117,390
HOOK, LINE AND SINKER PROTECTOR
Filed Aug. 23, 1953
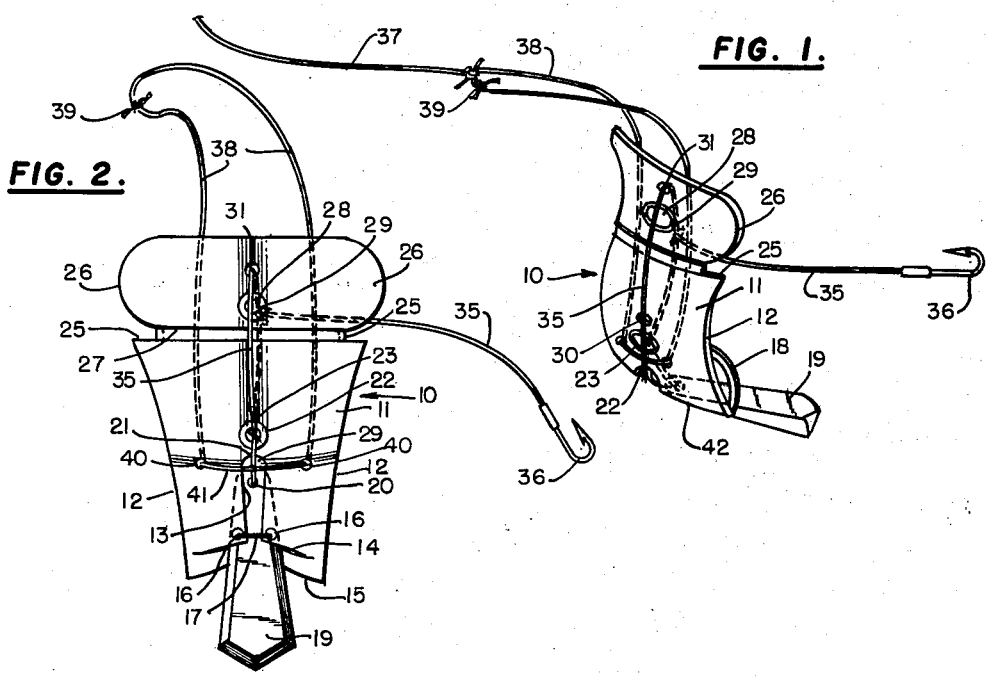
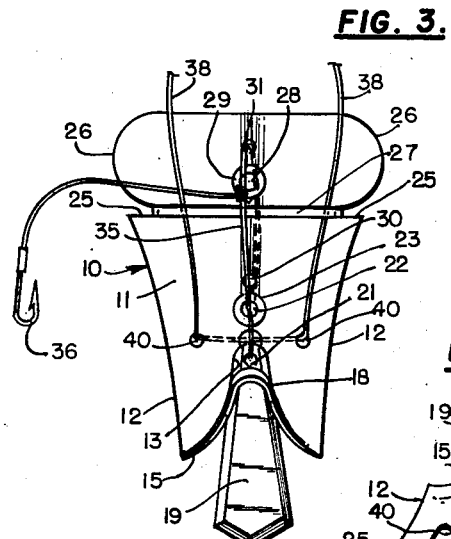
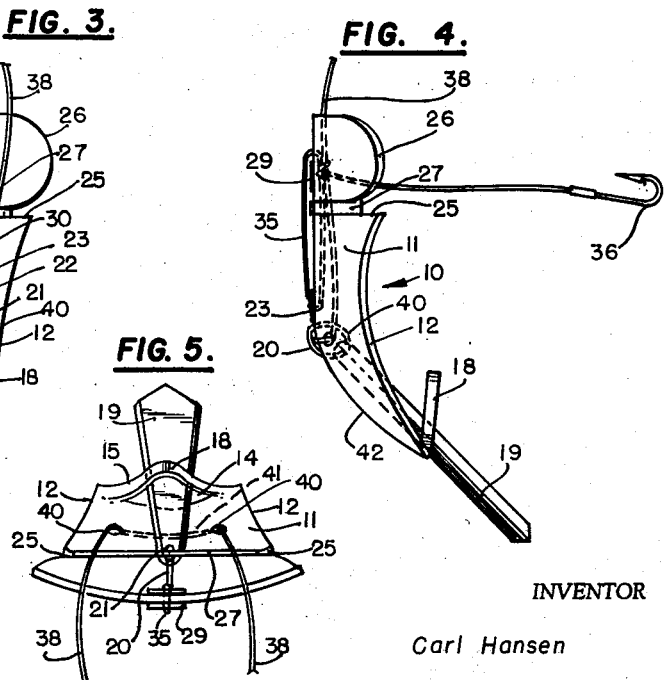
INVENTOR
Carl Hansen
BY
AGENT

3,117,390
HOOK, LINE AND SINKER PROTECTOR
Carl Hansen, 144—30 Farmers Blvd.,
Jamaica 34, Long Island, N.Y.
Filed Aug. 23, 1963, Ser. No. 304,195
4 Claims. (Cl. 43—44.97)

This invention relates to a hook, line and sinker protector, and has as its primary object the provision of a protector or shield which will protect the hook, line and sinker when dragged through rocks in bottom fishing, for example, which will protect the hook from fouling with the sinker, and which may be also employed as a spreader.

An additional object of the invention is the provision of a device of this character provided with adjustable lines to vary the lift imparted to the sinker when dragged across the bottom to clear rocks.

A further object of the invention is the provision of a sinker protector of this character which is made of flexible material such as rubber or the like, and so arranged that it may be dislodged by pulling from above in the event that it does become entangled in material on the bottom.

A further object of the invention is the provision of a device of this character which may be employed for top fishing, and which will float on the surface of the water when a sinker is omitted from the fishing rig.

Still another object of the invention is the provision of a device of this character which is sturdy and durable in construction, reliable and efficient in operation, and relatively simple and inexpensive to manufacture.

Other objects will in part be obvious and in part be pointed out as the description of the invention proceeds and shown in the accompanying drawings wherein:

FIGURE 1 is a perspective view of the sinker protector of the instant invention shown in association with a fish line and a fish hook.

FIG. 2 is a front elevational view of the device of FIG. 1.

FIG. 3 is a rear elevational view thereof.

FIG. 4 is a side elevational view of the device, and

FIG. 5 is a top plan view of the device, all showing the sinker positioned therein.

Similar reference characters refer to similar parts throughout the several views of the drawing.

The sinker protector of the instant invention is generally indicated at 10, and includes a body portion 11 which is provided with lower inwardly curved side walls 12. A central opening 13 is cut in the lower portion of the device, and a transverse slot 14 is cut across the base adjacent the lower or bottom edge 15. Openings 16 formed in adjacent sides of the device adjacent the slot 14 at the lower end of opening 13 are connected by cord or silk 17 to impart an arcuate transverse cross section to the lower portion of the device.

In use the strip 18 formed by the slot 14 is bowed upwardly rearwardly as best shown in FIG. 5, and the sinker 19 inserted therebeneath. A line 20 extended through the conventional opening 21 in the top of sinker 19 is passed through an aligned opening 22 surrounded by a grommet 23 located centrally of the body portion 11 above the top of the opening 13.

The upper portion of the body 11 is provided with oppositely disposed notches 25 on opposite sides thereof and the upper side walls terminate in arcuate portions 26. An elastic band 27 or the like is extended transversely about the body and seated in notches 25 and serves to permit full control of the device, as will be hereinafter described. An opening 28 surrounded by a grommet 29 is provided above the notches 25. Additional openings 30 and 31 may also be provided. The end of a leader 35 may be looped preferably through the opening 28 making sure leader 35 and hook 36 project through the grommet 29. This insures the securing of the leader 35 and its associated nook 36 firmly in position relative to the protector. It is noted that the leader projects forwardly of the protector, so that the hook 36 swings laterally and to one side of the device as shown in FIGS. 1 and 2.

The device is adapted to be connected to a fishing line 37 by means of a double strand 38 which is tied or knotted at its ends as at 39, and the length of which may be suitably adjusted. The strands 38 extend through a pair of oppositely positioned openings 40, which are in substantial transverse alignment with the top of opening 13, and the arrangement is such that the double strands 38 extend rearwardly or from the concave side of the device and upwardly. It is to be noted that the transverse portion 41 of the looped or double strand 38 extends across the convexed portion of the device at a median point substantially in line with the top or upper end of the sinker 19, so as to afford effective balance for the device.

The multiple holes 22, 28, 30 and 31 permit effective balancing of the device in accordance with the weight of the variety of sinkers which may be employed therewith.

In the use and operation of the device it will be readily apparent that the hook 36 may be baited in the usual manner, and the sinker 19 secured in position by means of the strand or line 20. The curvature of the device may be varied by varying the type of rubber band 27 or the tension exerted thereby. Line 37 is attached to the upper extremity of the double connecting cord 38, and, when employed for bottom fishing the hook 36 is baited and the protector is drawn along the bottom, with its convex lower surface 42, as best shown in FIG. 4, serving to effectually lift the sinker 19 over rocks and obstacles on the bottom. The hook 36 extends laterally or transversely in such a position that it will not become entangled with the sinker. Additionally, when a fish strikes the baited hook 36 the device is caused to balance, which occasions a certain backlash, and sets the hook. When employed for surface fishing, the concave lower surface 42 will cause the device to ride erratically along the upper surface of the water, if the sinker 19 is omitted.

The lines 38 pass underneath the elastic band 27 in the concavity of the body, so that when the line is pulled full control of direction and height is provided. Additionally, if the device becomes snagged in rocks or the like, by pulling upwardly on the line, the line flexes the band forwardly toward the top of the sinker, thus pulling the sinker upwardly and freeing the device.

The convexed forward surface of the device also serves to reduce any tendency toward snagging or otherwise entangling the device with obstacles on the bottom when employed for the bottom fishing.

From the foregoing it will now be seen that there is herein provided an improved hook, line and sinker protector, which accomplishes all of the objects of this invention, and others, including many advantages of great practical utility.

As various embodiments may be made of this inventive concept, and as various modifications may be made in the embodiments hereinbefore shown and described, it is to be understood that all matter herein is to be interpreted merely as iliustratve and not in a limiting sense.

I claim:

1. A sinker protector comprised of a sheet of resilient material formed with downwardly tapered sides and having a central longitudinal elongated opening terminating in a transverse slit forming a bottom strip, there being aligned vertical openings above said elongated opening, there being aligned transverse openings adjacent the top of said elongated opening, and there being opposed notches on opposite sides of the sheet above the upper end of said elongated opening, means securing the lower edges of said elongated opening together to concave the bottom part of said sheet, a sinker secured in said elongated opening and beneath said bottom strip, a leader secured in said vertical openings, a hook on the free end of said leader, resilient means in said notches concaving the front of said sheet rearwardly, and double lines secured in said transverse openings knotted at their ends and attached to a fishing line.

2. A sinker protector comprised of a sheet of resilient material formed with downwardly tapered sides and having a central longitudinal elongated opening terminating in a transverse slit forming a bottom strip, there being aligned vertical openings above said elongated opening, there being aligned transverse openings adjacent the top of said elongated opening, and there being opposed notches on opposite sides of the sheet above the upper end of said elongated opening, means securing the lower edges of said elongated opening together to concave the bottom part of said sheet, a sinker secured in said elongated opening and beneath said bottom strip, a leader secured in said vertical openings, a hook on the free end of said leader, resilient means in said notches concaving the front of said sheet rearwardly, and double lines secured in said transverse openings knotted at their ends and attached to a fishing line, certain of said openings having grommets therein.

3. A sinker protector comprised of a sheet of resilient material formed with downwardly tapered sides and having a central longitudinal elongated opening terminating in a transverse slit forming a bottom strip, there being aligned vertical openings above said elongated opening, there being aligned transcerse openings adjacent the top of said elongated opening, and there being opposed notches on opposite sides of the sheet above the upper end of said elongated opening, means securing the lower edges of said elongated opening together to concave the bottom part of said sheet, a sinker and means securing said sinker in said elongated opening and beneath said bottom strip, a leader secured in said vertical openings, a hook on the free end of said leader, resilient means in said notches concaving the front of said sheet rearwardly, and double lines secured in said transverse openings knotted at their ends and attached to a fishing line, certain of said openings having grommets therein, the means securing said sinker in said elongated opening comprising a tie line extended through an opening in said sinker and one of said vertical openings.

4. A sinker protector comprised of a sheet of resilient material formed with downwardly tapered sides and having a central longitudinal elongated opening terminating in a transverse slit forming a bottom strip, there being aligned vertical openings above said elongated opening, there being aligned transverse openings adjacent the top of said elongated opening, and there being opposed notches on opposite sides of the sheet above the upper end of said elongated opening, means securing the lower edges of said elongated opening together to concave the bottom part of said sheet, a sinker and means securing said sinker secured in said elongated opening and beneath said bottom strip, a leader secured in said vertical openings, a hook on the free end of said leader, resilient means in said notches concaving the front of said sheet rearwardly, and double lines secured in said transverse openings knotted at their ends and attached to a fishing line, certain of said openings having grommets therein, the means securing said sinker in said elongated opening comprising a tie line extended through an opening in said sinker and one of said vertical openings, said resilient means in said notches comprising a rubber band stretched transversely around said sheet.

No references cited.